Feb. 23, 1937.   J. VON ISSENDORFF   2,071,805
REVERSIBLE CONVERSION SYSTEM
Filed March 9, 1935
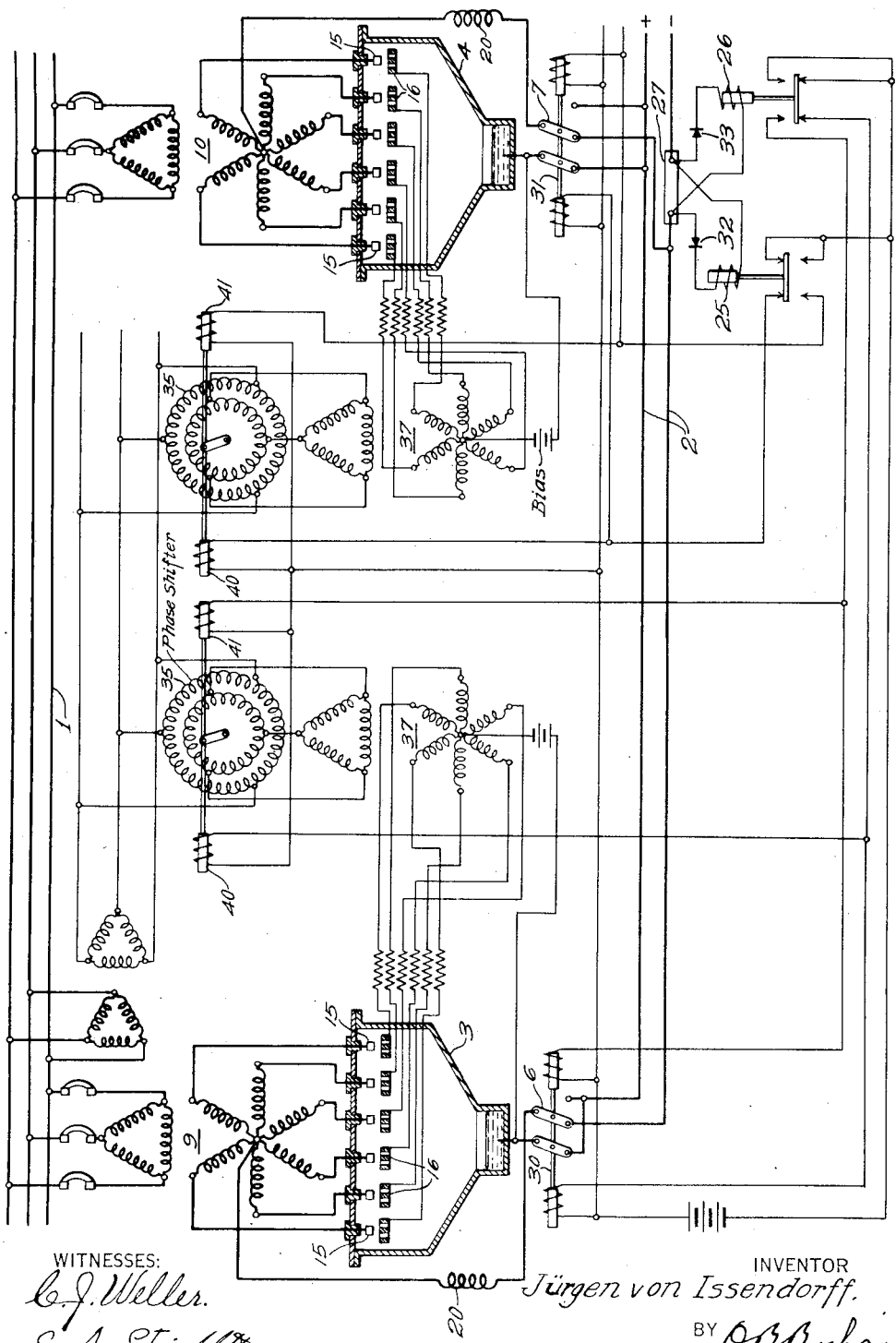
WITNESSES:
C. J. Weller.
S. A. Stricklett
INVENTOR
Jürgen von Issendorff.
BY O. B. Buchanan
ATTORNEY Patented Feb. 23, 1937

2,071,805

UNITED STATES PATENT OFFICE 2,071,805

REVERSIBLE CONVERSION SYSTEM

Jürgen von Issendorff, Berlin-Siemensstadt, Germany, assignor to Westinghouse Electric & Manufacturing Company, East Pittsburgh, Pa., a corporation of Pennsylvania Application March 9, 1935, Serial No. 10,202
In Germany March 6, 1934

5 Claims. (Cl. 175—363)

My invention relates to a reversible conversion system, and particularly, to a vapor-electric converting system capable of delivering energy in either direction without interruption of service.

While it has heretofore been possible to operate valve type converters, such as mercury arc rectifiers, to deliver energy from either an alternating-current source to a direct-current consuming circuit, or from a direct-current source to an alternating-current consuming circuit, it has not been heretofore practical to operate such devices on reversible energy conversion systems without either interrupting the service momentarily or by utilizing a plurality of converters, each of which operates in only one direction. To use converters adapted for operation in only one direction is highly uneconomical in that the converter is utilized only for a portion of the time. Also, when the same converter is utilized for both modes of operation, the heretofore necessary interruption of service has made such devices undesirable.

It is, therefore, an object of my invention to provide a conversion system capable of delivering energy in either direction as the occasion may require, without interruption of service, and so connect the converter that the full capacity is available in either direction of current transfer.

According to my invention, a plurality of independent parallel converters are connected between the alternating-current and direct-current lines, and each of the converters is provided with suitable switching mechanism to permit the connection of the converter for energy transfer in either direction, and automatic means responsive to the load condition of the direct-current line for connecting the converters in step-by-step relation so that before the actual reversal of energy flow between the circuits at least one of the converters will be connected in the proper sense to effect the desired energy transfer.

Other objects and advantages of my invention will be apparent from the following detailed description taken in conjunction with the accompanying drawing, in which the single figure is a schematic illustration of a conversion system embodying my invention.

The apparatus according to my invention comprises an alternating-current circuit 1 preferably polyphase, and a direct-current circuit 2, which may be either a load circuit or a source of power as the occasion may demand. The conversion equipment comprises a plurality (at least two) of distinct vapor-electric converters 3 and 4 connected to the direct-current circuit 2 by suitable reversing switches 6 and 7 and to the alternating-current circuit 1 by suitable transformers 9 and 10. Preferably, the valves 15 of the converters 3 and 4 are provided with suitable grids 16 which are, in turn, supplied with potential impulses to control the operation of the valves. Each of the valve type converters 3 and 4 is provided with a suitable smoothing reactor 20, so that the converters 3 and 4 operate as individual units, regardless of the direction of energy transfer therethrough. The reversible switches 6 and 7 connected between the converters 3 and 4 and the direct-current line 2 are so positioned that the cathodes and return leads thereof may be connected at will to either polarity of the direct-current line 2.

While any suitable means may be utilized for operating the reversing switches 6 and 7 in response to the load characteristic of the direct-current circuit 2, I prefer to use an electro-magnetic system in which relays 25—26 connected across a shunt 27 in a direct-current circuit 2 controls magnetic operating devices 30—31 which determine the position of the reversible switches 6 and 7.

Each of the relay elements 30—31 has connected in series therewith a suitable uni-directional conductor, such as a copper-oxide rectifier, so that energy flow through the relays is determined by the direction of current flow in the shunt 27. Preferably, therefore, the individual relays 30—31 have uni-directional conductors 32—33 operable in opposite directions, so that current flow in a given direction in the direct-current line 2 will operate only one of the relay elements. Suitable contacts carried by the relays 25—26 close the circuits to the magnetic elements 30—31 controlling the reversing switches 6—7.

In the operation of the apparatus according to my invention, current flow through the converters 3 and 4 to the direct-current line 2 will energize the relays 25—26 in such a manner that energy is supplied to the magnetic elements 30—31 in such a manner that the reversing switches 6—7 are held in the rectifying position. However, when the rectifier current falls to a suitable low value, the relay 25 connected with the converter 4 will drop out, which, in turn, closes a suitable contact which actuates the magnetic element 31 in the reverse direction, which positions the reversing switch 7 so that the converter 4 is connected for inverter service, that is, to transfer energy from the direct-current circuit 2 to the alternating-current circuit 1. It is thus seen that one of the converter elements is so connected as to be ready to transfer energy from the direct-current circuit to the alternating-current circuit prior to the cessation of energy transfer from the alternating-current circuit to the direct-current circuit. If then the reversal of energy takes place, the flow of energy in the reverse direction operates the relay 26 connected to the remaining inverter 3 and the pick-up of this relay 26 supplies energy to reverse the connection of the remaining converter 3, so that both converters are now in position to deliver energy from the direct-current circuit 2 to the alternating-current circuit 1. The reversal from inverter to rectifier operation follows the same steps, but in the reverse direction. The decrease in energy flow from the direct-current circuit to the alternating-current circuit will denergize the relay 26, which drops out and reverses the magnetic control for the reversing switch 6, which thereupon connects the converter 3 for rectifying operation before the actual commencement of energy flow from the alternating-current circuit to the direct-current circuit.

When changing over the converters from rectifier to inverter service, or vice versa, it is necessary to shift the phase of the grid impulses to correspond with the duties desired of the converter. While this may be accomplished by any suitable means, I prefer to provide a phase-shifting device 35 in series with an impulsing transformer 37 which supplies the control impulses to the grids 16 of the individual valves. The phase-shifters 35 are preferably provided with suitable control elements 40—41, such as magnetic control, which may be either connected in parallel with the magnetic controls 30—31 for the reversible switches 6—7, or may be actuated by independent relays. If desired, suitable interlocks may be provided to prevent circulation of current between the independent converters at the instant when each of the converters is connected for an opposite mode of operation.

While I have shown and described a specific embodiment of my invention, it will be apparent to those skilled in the art that many changes and modifications can be made therein without departing from the true spirit of my invention or the scope of the appended claims.

I claim as my invention:

1. A continuously operable reversible current conversion system comprising an alternating-current system, a direct-current system, at least two grid controlled arc-discharge devices for transferring energy between said systems, switching means for each of said devices for determining the direction of current transfer thereby, a source of potential connected to said grids and relays for controlling said switching means whereby the connection of the arc discharge devices is controlled in a step-by-step manner in accordance with the electrical operating values of the direct-current circuit, so that one of said converters is connected for reverse operation before actual reversal of current flow between said lines.

2. A continuously operable reversible current conversion system comprising an alternating-current system, a direct-current system, at least two grid controlled arc-discharge devices for transferring energy between said systems, switching means for each of said devices for determining the direction of current transfer thereby, a source of potential connected to said grids and relays for controlling said switching means whereby the connection of the arc discharge devices is controlled in a step-by-step manner in accordance with the electrical operating values of the direct-current circuit so that one of said converters is connected for reverse operation before actual reversal of current flow between said lines, and means operable by said relay for altering the phase relation of the potential applied to said grids.

3. A reversible current conversion system comprising an alternating-current line, a direct-current line, a plurality of valve type converters for transferring energy between said lines, means connected to each converter for reversing the direction of energy transfer thereby, relays connected to said direct-current line for operating said reversing means in a step-by-step manner in accordance with the current conditions in said direct-current line, said relays being so connected that the reversing means of one of said converters is operated previous to the actual reversal of current flow in said direct-current line.

4. An electrical translating system comprising an alternating-current line, a direct-current line, at least two valve type converters interconnecting said lines, independent switching means associated with each converter for connecting the same to transfer energy in either direction, control means for each converter adjustable to control energy flow in either direction, and relay means responsive to the electrical conditions of the direct-current line for simultaneously actuating both said switching means and said control means, said relay means being so connected that the reversal of energy transfer in the individual converter occurs in step-by-step sequence.

5. An electric current converting system capable of delivering current in either direction without discontinuity of service, comprising an alternating-current circuit, a direct-current circuit, a plurality of valve type converters for transferring energy between said circuits, switching means for determining the direction of energy transfer by each of said converters and automatic means for operating said switching means in a step-by-step manner in accordance with the electrical operating values of the direct-current circuit, said automatic means being so adjusted that upon the reversal of energy transfer between said circuits at least one of said converters will be reversed before the beginning of the reverse energy flow.

JÜRGEN VON ISSENDORFF.